United States Patent [19]

Freeman

[11] Patent Number: 4,994,233

[45] Date of Patent: Feb. 19, 1991

[54] FUEL ROD WITH AXIAL REGIONS OF ANNULAR AND STANDARD FUEL PELLETS

[75] Inventor: Thomas R. Freeman, Columbia, S.C.

[73] Assignee: Westinghouse Electric Corp., Pittsburgh, Pa.

[21] Appl. No.: 302,500

[22] Filed: Jan. 27, 1989

[51] Int. Cl.⁵ .............................................. G21C 3/30
[52] U.S. Cl. ...................................... 376/428; 376/455
[58] Field of Search .................................. 376/428, 455

[56] References Cited

U.S. PATENT DOCUMENTS

| | | | |
|---|---|---|---|
| 3,215,607 | 9/1965 | Lackey | 176/67 |
| 3,376,201 | 7/1968 | Bain | 176/67 |
| 3,580,809 | 6/1971 | Williams et al. | 176/76 |
| 3,932,217 | 12/1976 | Cachera | 176/83 |
| 4,273,616 | 3/1981 | Andrews | 176/68 |
| 4,372,911 | 4/1983 | Cachera | 376/349 |
| 4,393,510 | 5/1983 | Lang et al. | 376/172 |
| 4,493,814 | 11/1985 | Beard, Jr. et al. | 376/428 |
| 4,687,629 | 8/1987 | Mildrum | 376/428 |

FOREIGN PATENT DOCUMENTS

| | | | |
|---|---|---|---|
| 637435 | 2/1962 | Canada | 376/428 |
| 717434 | 9/1965 | Canada | 376/428 |
| 0093901 | 11/1983 | European Pat. Off. | |
| 2127240 | 12/1971 | Fed. Rep. of Germany | |

Primary Examiner—Donald P. Walsh
Assistant Examiner—Meena Chelliah

[57] ABSTRACT

A nuclear fuel rod has an elongated hollow cladding tube with a pair of end plugs and fuel pellets contained in the tube and extending between the end plugs. All pellets are composed of fissile material having a single enrichment. The pellets are provided in an axial stack having a length slightly less than the distance between the end plugs such that when the tube is disposed in a vertical orientation the stack of pellets at a lower end rests on the lower end plug and at an upper end is spaced from upper end plug by a gap. The gap is devoid of any structure restraining the stack from movement toward the upper end plug. The pellets in the stack are provided in an arrangement of axial regions which includes a pair of first opposite end axial regions and second and third tandemly-disposed middle axial regions between the first axial regions. The pellets in the first opposite end axial regions are identical in number and have annular configurations with an annulus of a first void size. Pellets in the second axial region have annular configurations with an annulus of a second void size smaller than the first void size of the annulus of pellet in the first axial regions. Pellets in the third axial region have solid configurations.

12 Claims, 3 Drawing Sheets

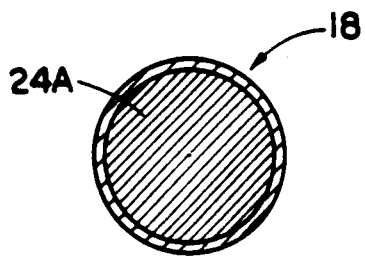
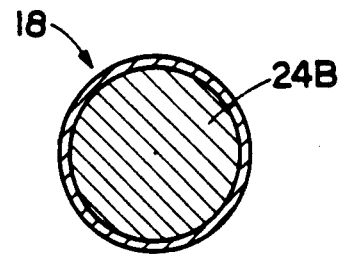
FIG. 5     FIG. 6
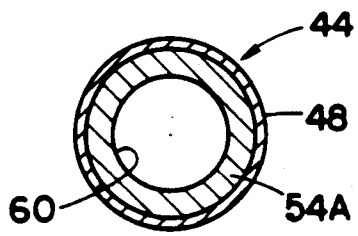
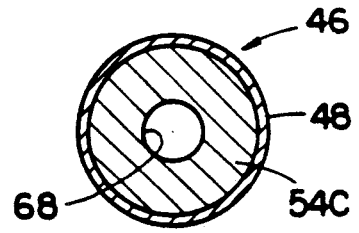
FIG. 7     FIG. 8
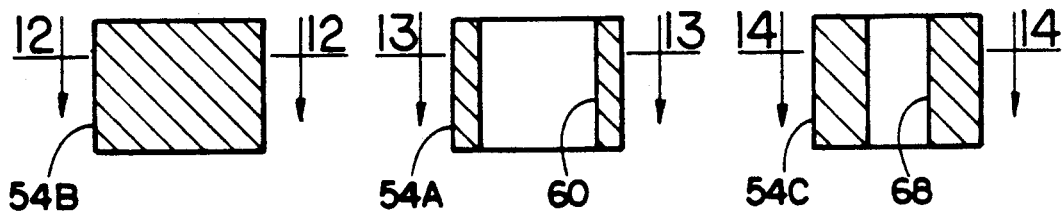
FIG. 9     FIG. 10     FIG. 11
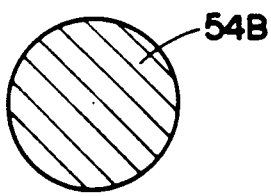
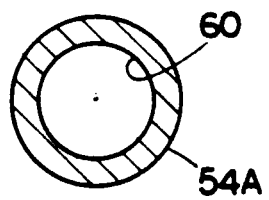
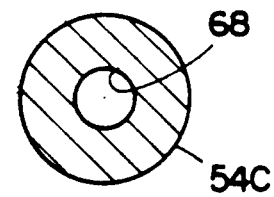
FIG. 12     FIG. 13     FIG. 14

FUEL ROD WITH AXIAL REGIONS OF ANNULAR AND STANDARD FUEL PELLETS

BACKGROUND OF THE INVENTION

1. Field of the Invention

The present invention relates generally to fuel assemblies for a nuclear reactor and, more particularly, is concerned with fuel rods in a fuel assembly containing axial regions of annular and standard fuel pellets having the same U-235 enrichment.

2. Description of the Prior Art

In a typical pressurized water nuclear reactor (PWR), the reactor core includes a large number of fuel assemblies each of which is composed of a plurality of elongated fuel elements or rods transversely spaced apart from one another. The fuel rods each contain fissile material and are grouped together in an array organized to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

The fissile material contained in each fuel rod is typically enriched uranium (for example, uranium which has 4.0 weight percent U-235 in U-238), provided in the form of a stack of fuel pellets. The reaction which produces energy in a nuclear reactor is the neutron-induced fission of enriched uranium atoms. However, neutrons released at the opposite ends of the fuel stack have a greater probability of escaping from the core than do neutrons in the portion of the fuel rod between the ends. Because these escaped or leaked neutrons can no longer produce fission events, neutron leakage is wasteful, expensive and should be reduced.

Due to the escape of a greater proportion of neutrons at the opposite ends of the fuel rod, the distribution of fission-inducing neutrons is approximately cosinosoidal along the axis of the fuel rods. As a result, the depletion of fissile fuel, or burnup, distribution along the length of a fuel rod is non-uniform, with the ends of the rod receiving less burnup than the center. This is inefficient utilization of the enriched uranium in the fuel rod ends. Since more than 70% of the total fuel cycle cost is devoted to buying and enriching uranium to ensure that there is enough available to maintain the fission chain reaction, approaches which can reduce the number of neutrons that escape from the core produce significant economic benefits.

One well-known approach to reducing neutron leakage and this resulting inefficiency is to create axial blankets at the top and bottom of the fuel rods. Axial blankets are created by substitution of pellets of natural uranium (i.e., uranium which has 0.71 weight percent U-235 in U-238) for pellets of enriched uranium in short regions at both ends of the fuel rod. In the VANTAGE+PWR fuel rods manufactured and marketed by the assignee of the present invention, axial blanket pellets have typically solid right cylinder configurations, although optionally annular axial blanket pellets are available for use, if necessary, to provide more space for fission gas release. By way of example, in the VANTAGE+PWR fuel assembly each fuel rod is 144 inches long, each region of axial blanket natural uranium pellets at each opposite end is 6 inches long and the remainder of the pellet stack of enriched uranium extending between the axial blankets is 132 inches in length. Since these axial blankets contain less uranium 235, they give up fewer neutrons to leakage from the core.

Axial blankets reduce neutron leakage approximately 50% and function to generate plutonium by the absorption of neutrons. Because plutonium is fissile material, the blanket pellets improve the burnup distribution somewhat. However, axial blankets release fewer neutrons at the beginning of life (BOL) than toward the end of life (EOL) of the core when more plutonium is generated. This means that there is more neutron leakage in the case of axial blankets at EOL than at BOL which is just the opposite of what is desirable. Thus, even fuel rods using axial blankets at their opposite ends fail to achieve full burnup and thus attain less than optimum fuel utilization at such locations.

Another approach disclosed in U.S. Pat. No. 4,493,814 to Beard, Jr. et al, assigned to the assignee of the present invention, is to substitute in place the pellets in an inner axial region of each axial blanket and in an outer axial region of each opposite end of the remaining standard pellets a row of low density fuel pellets. The remaining pellets between the low density pellets can be standard density fuel pellets. For example, now the axial blankets will each be 4 inches in length, each row of low density pellets will be 4 inches long and the remaining standard pellets in between will be 128 inches in length. These low density pellets could be hollow annular pellets, lower density pellets, smaller pellets or some other concept designed to reduce the uranium loading per unit length. The uranium 235 enrichment of these low density pellets would typically be the same as the standard enriched uranium pellets of the rod.

This latter approach is believed to improve neutron flux distribution and consequently the resulting burnup distribution and utilization of uranium over the use of axial blankets alone. While provision of the low density pellets in Beard, Jr. et al appears to be a step in the right direction, the approach still fails to reach optimum results in terms of uranium burnup and utilization. Still another approach disclosed in U.S. Pat. No. 4,687,629 to Mildrum, assigned to the assignee of the present invention, is to provide a fuel rod with a complete stack of annular fuel pellets having the same U-235 enrichment and different annulus sizes for graduated enrichment loading. This approach designed with a boiling water nuclear reactor (BWR) fuel rod in mind is not seen as providing an optimum design for uranium burnup and utilization in a PWR fuel rod. Consequently, a need exists for further improvements which hold out promise to provide optimum results.

SUMMARY OF THE INVENTION

The present invention provides an improved fuel rod designed to satisfy the aforementioned needs. Like the prior art PWR fuel rod of Beard, Jr. et al, the fuel rod of the present invention provides a combination of annular and solid fuel pellets in axial regions which have the same uranium enrichment. Unlike the prior art PWR fuel rod of the Beard, Jr. et al patent, the fuel rod of the present invention has completely eliminated the axial blanket regions of natural uranium fuel pellets at the opposite ends of the fuel rod. Further, unlike the prior art PWR fuel rods and the prior art BWR fuel rod of Mildrum, the fuel rod of the present invention has eliminated the need for a long plenum chamber between the upper end of the fuel rod and the upper end of the pellet stack and, as a consequence, the need for the plenum spring and thereby allowing increased pellet stack length. Still further, unlike the prior art BWR fuel rod of Mildrum, the fuel rod of the present invention approaches an optimum result in terms of fuel burnup and utilization without requiring change to every fuel pellet in the stack thereof.

Accordingly, the present invention is directed to a fuel rod for a nuclear reactor fuel assembly which includes: (a) a hollow elongated cladding tube; (b) a pair of end plugs connected to and sealing the cladding tube at opposite ends thereof; and (c) a plurality of fuel pellets contained in and extending between the end plugs at the opposite ends of the tube, all of the fuel pellets contained in the tube being composed of fissile material being enriched above the level of natural enrichment. Also, the fuel pellets are provided in an axial stack having a length slightly less than the distance between the end plugs at the opposite ends of the tube such that when the tube is disposed in a vertical orientation the stack of pellets at a lower end rests on a lower one of the end plugs and at an upper end is spaced from the upper one of the end plugs by a gap. The gap is devoid of any structure for restraining the upper end of the stack of pellets from movement toward the upper one of the end plugs. Further, the fuel pellets in the stack thereof are provided in a predetermined arrangement of axial regions which includes a pair of first axial regions defined respectively at the opposite ends of the pellet stack. The pellets in the first axial regions are identical in number and have annular configurations with an annulus of a first void size. Specifically, the first void size of each pellet in the first axial regions is about forty percent of the volume of the pellet.

Still further, the arrangement of axial regions includes second and third axial regions defined in tandem relation to one another between the first axial regions. The pellets in the second axial region have annular configurations with an annulus of a second void size smaller than the first void size of the annulus of each pellet in the first axial regions. Specifically, the second void size of each pellet in the second axial region is about ten percent of the volume of the pellet. The pellets in the third axial region have solid configurations.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is an enlarged cross-sectional view taken along line 5—5 of FIG. 2 through a natural uranium blanket fuel pellet.

FIG. 6 is an enlarged cross-sectional view taken along line 6—6 of FIG. 2 through an enriched uranium standard fuel pellet.

FIG. 7 is an enlarged cross-sectional view taken along line 7—7 of FIG. 3 through an enriched uranium annular fuel pellet having one void size.

FIG. 8 is an enlarged cross-sectional view taken along line 8—8 of FIG. 4 through an enriched uranium annular fuel pellet having another void size.

FIG. 9 is an enlarged axial sectional view of an enriched uranium standard fuel pellet.

FIG. 10 is an enlarged axial sectional view of an enriched uranium annular fuel pellet having the one void size.

FIG. 11 is an enlarged axial sectional view of an enriched uranium annular fuel pellet having the other void size.

FIG. 12 is a cross-sectional view taken along line 12—12 of FIG. 9.

FIG. 13 is a cross-sectional view taken along line 13—13 of FIG. 10.

FIG. 14 is a cross-sectional view taken along line 14—14 of FIG. 11.

DETAILED DESCRIPTION OF THE INVENTION

Figure 1:
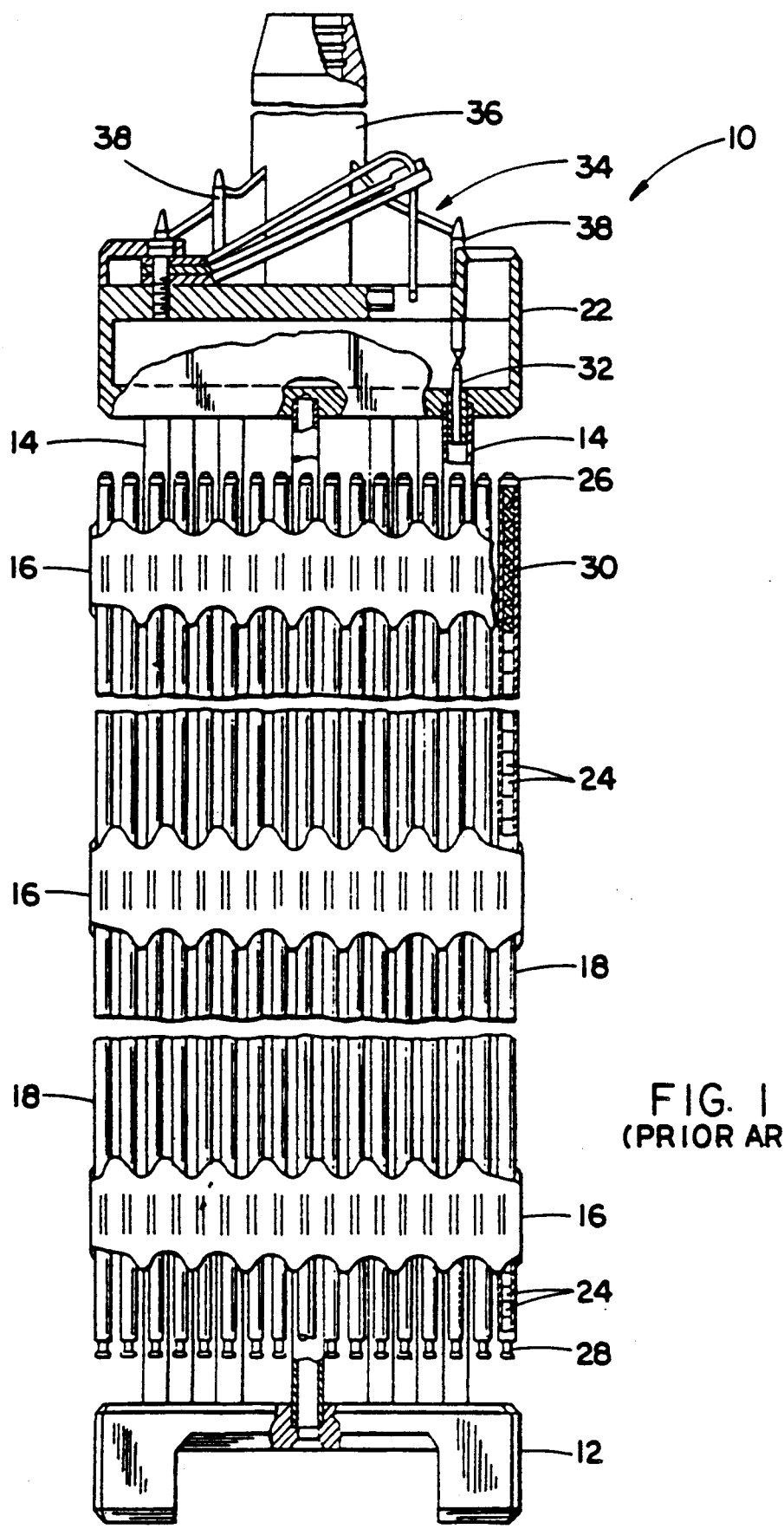
FIG. 1 is an elevational view, partly in section, of a prior art PWR fuel assembly in which the fuel rods of the present invention are intended to be employed, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically or longitudinally foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Figure 2:
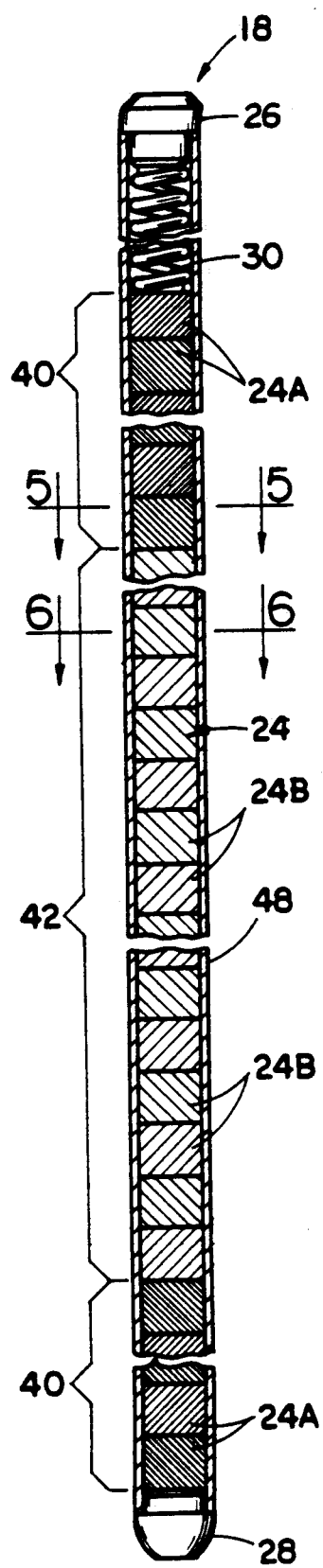
FIG. 2 is an enlarged, longitudinally foreshortened, axial sectional view of a prior art fuel rod installed in the fuel assembly of FIG. 1.

Turning now to FIG. 2, it can be seen that the fuel pellets 24 in the stack thereof provided in the prior art fuel rod 18 are organized into pellets 24A in a pair of end regions 40 and pellets 24B in a middle region 42 of the stack. Being also shown in FIG. 5, the pellets 24A positioned in the opposite end regions of the stack are composed of natural uranium dioxide and thus are what has been described hereinbefore as axial blankets. Being also depicted in FIGS. 6 and 9, the pellets 24B positioned in the middle region 42 of the stack between the opposite end regions 40 thereof are composed of enriched uranium dioxide and thus are what has been described hereinbefore as standard pellets.

Fuel Rod of the Present Invention

Figure 3:
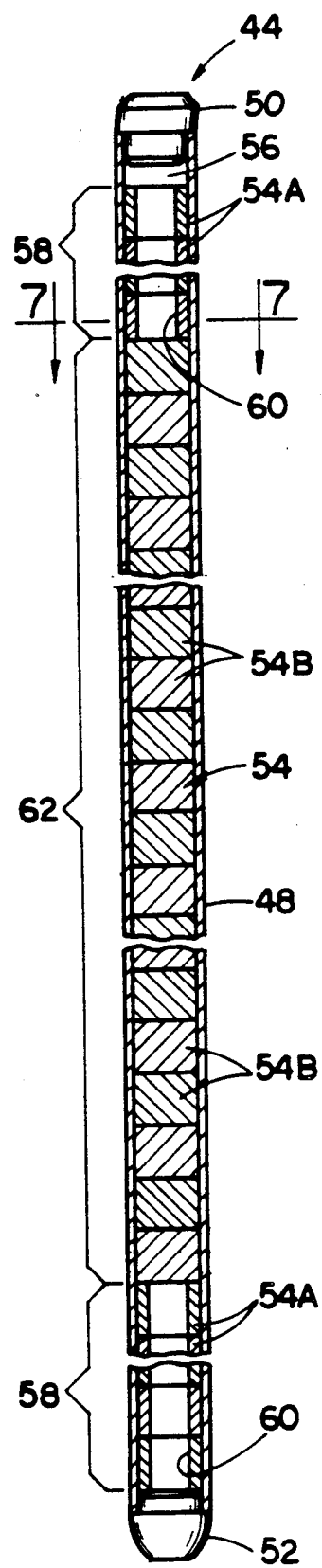
FIG. 3 is an enlarged, longitudinally foreshortened, axial sectional view of one embodiment of a fuel rod of the present invention.
Figure 4:
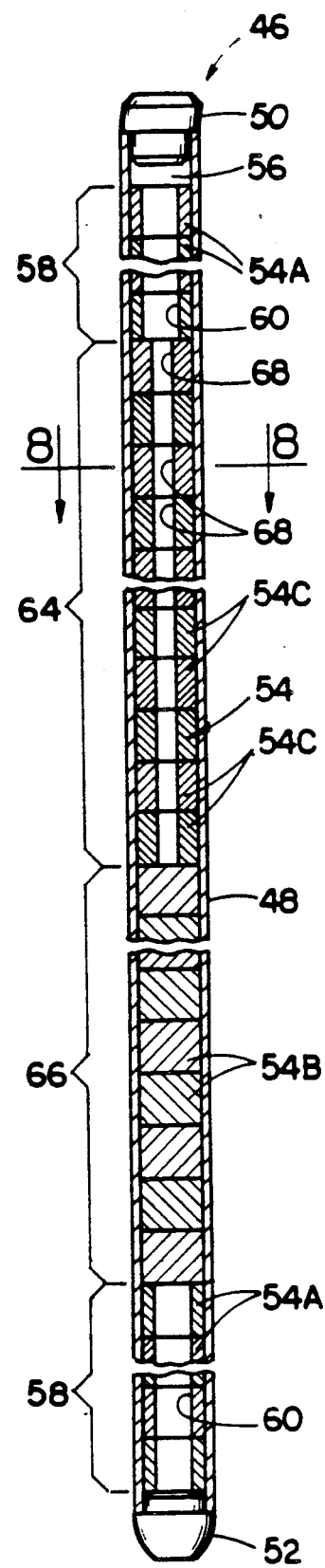
FIG. 4 is an enlarged, longitudinally foreshortened, axial sectional view of another embodiment of a fuel rod of the present invention.

Referring now to FIGS. 3 and 4, there are illustrated first and second embodiments of fuel rods 44, 46 in accordance with the present invention. As in the case of the prior art fuel rod 18, each of the fuel rods 44, 46 includes an elongated hollow cladding tube 48 and a pair of end plugs 50, 52 connected to and sealing the cladding tube 48 at opposite ends thereof.

In accordance with the present invention, each of the fuel rods 44, 46 includes a plurality of fuel pellets 54 contained in and extending between the end plugs 50, 52 at the opposite ends of the cladding tube 48. All of the fuel pellets 54 contained in the tube 48 are composed of fissile material having a single enrichment, such as uranium which has 4.0 weight percent U-235 in U-238.

Also, in the fuel rods 44, 46, there is no plenum nor plenum spring as found in the prior art fuel rod 18. Instead, the fuel pellets 54 in the fuel rods 44, 46 are provided in an axial stack having a length slightly less than the distance between the end plugs 50, 52 at the opposite ends of the cladding tube 48. Thus, when the cladding tube 48 is disposed in a vertical orientation the stack of pellets 54 at a lower end rests on the lower end plug 52 and at an upper end is spaced below the upper end plug 50 by a gap 56. The gap 56 is devoid of any structure, such as a plenum spring, for restraining the upper end of the stack of pellets 54 from movement toward the upper end plug 50.

Further, in the fuel rods 44, 46, the fuel pellets 54 in the stack thereof are provided in two different arrangements of axial regions of pellets 54. In both fuel rods 44, 46, the arrangement of axial regions of pellets 54 include a pair of first axial regions 58 defined respectively at the opposite ends of the stacks of pellets 54. The pellets 54A in the pairs of first axial regions 58 of both fuel rods 44, 46 are identical in number and have substantially identical annular configurations with an annulus 60 of a first void size, as shown in FIGS. 3, 4, 7, 10 and 13. These annular pellets 54A take the place of the axial blanket pellets 24A in the opposite end regions 40 of the prior art fuel rod 18. Preferably, the first void size of each pellet 54A in the first axial regions 58 is about forty percent of the volume of the pellet.

In the fuel rod 44 of FIG. 3, the arrangement of axial regions of pellets 54 includes only a second axial region 62 defined between the first axial regions 58. The pellets 54B in the second axial region 62 have solid configurations, such as seen in FIGS. 1, 6, 9 and 12. These pellets 54B are identical to pellets 24B in the middle region 42 of the prior art fuel rod 18.

Compared to the fuel rod 44 of FIG. 3, the arrangement of axial regions of pellets 54 in the fuel rod 46 of FIG. 4 includes second and third axial regions 64, 66 defined in tandem relation to one another between the first axial regions 58. The pellets 54C in the second axial region 64 of the fuel rod 46 have substantially identical annular configurations with an annulus 68 of a second void size, as seen in FIGS. 4, 8, 11 and 14, being smaller than the first void size of the annulus 60 of the pellets 54A in the first axial regions 58. The second void size of each pellet 54C in the second axial region 64 is about ten percent of the volume of the pellet 54C. The pellets 54B in the third axial region 66 have solid configurations and are substantially identical to the pellets 54B in the second axial region 62 of the other fuel rod 44.

Thus, the fuel rod 46 includes four axial regions 58, 64, 66 of pellets 54. Three of these four regions are different. All regions include pellets of enriched fuel and two of the three types are annular. Usually the enrichment of all the regions is the same. Besides the fact that some of the fuel pellets 54 are annular, the other important feature about the fuel pellet stack is that it is about five inches longer than the fuel stack in the prior art fuel rod 18.

With respect to both fuel rods 44, 46, there are four main reasons for provision of the annular pellets 54A in the first axial regions 58 at the opposite ends of the pellet stack which is at the opposite ends of the reactor core. First, the annular pellets 54A add plenum volume to the fuel rods which is necessary because the normal plenum at the top of the stack of pellets 24 in the prior art fuel rod 18 is greatly reduced because of the longer fuel stack in fuel rods 44, 46. Second, the annular pellets 54 provide an increase in the thermal flux at the ends of the core which is desirable to increase the burnup of the enriched fuel in these end regions 58. To get a significant increase, it is necessary to make a significant change in the H/U ratio. About a factor of two change was made. Third, as a result of the change in the H/U ratio, the fuel in these regions burns out faster than it normally would and, because there is less fuel there to begin with, the amount of power produced by the ends of the core at EOL is low which makes this a low axial leakage fuel. Fourth, at BOL, just the opposite is true. The relative power at the ends of the core is higher than it would normally be (this is the reason the regions burn out faster). This higher power leads to a lower peaking factor in the core since the rest of the core can supply somewhat less power.

With respect to the fuel rod 46, there are three principal reasons for provision of the annular pellets 54C in the second axial region 64 in the top half of the core below the top end axial region 58 at the upper end of the reactor core. First, the annular pellets 54C add plenum volume to make up for that portion of the plenum at the top of the pellet stack that is lost because of the longer pellet stack. Second, the annular pellets 54C improve LOCA margin. This is produced in two ways. In one way, pellet temperatures are reduced because of the presence of the annulus. This reduction in the pellet average temperature means that the stored energy of the pellet is less which is the LOCA benefit. In the other way, because there is less fuel in the top half of the core, there is less power produced there. Since there is more LOCA margin in the bottom of the core, it is advantageous to provide relatively more power there. This makes a better match of power to margin. Third, with the annular pellets 54C, fuel is removed from the top half of the core. The H/U ratio is thereby increased in the top half of the core which is a fuel cycle cost (FCC) benefit. This is better than a uniform H/U change to the whole core because it produces a better match to the actual water density in the core which decreases with height in the core.

With respect to the fuel rod 46, there are two principal reasons for provision of the standard solid pellets 54B in the third axial region 66 in the bottom half of the core above the bottom end axial region 58 at the bottom end of the reactor core. First, more of the fuel in the fuel rod is located where the water is denser which is a FCC benefit. The match to optimum H/U ratio is better. Second, more fuel at the bottom tends to move the power where there is more LOCA margin.

Further, even though the plenum volume at the top of the fuel rod 44, 46 has been decreased (from seven to about two inches) because the pellet stack has been lengthened, the actual plenum volume in the core is increased by about a factor of two. Further, even though there is a fuel stack length increase of about five inches in the fuel rods 44, 46, the mass of fuel in the fuel rods is decreased because of the increase in plenum volume by the annular pellets 54A, 54C. This mass decrease does not mean that less energy can be obtained from an assembly using these rods. The reason for this is that the annular design more uniformly burns the fuel so that the average burnup of the rod can go up without the peak burnup increasing. For example, the annular end axial regions 58 of the rods 44, 46 produce more power per unit length than the axial blanket regions 40. This also means that the peak U-235 enrichment required in the first axial regions 58 of the rods 44, 46 will be less than comparable rods. Thus, in spite of the reduced fuel mass, this invention will produce more energy per unit fuel mass which will make it somewhat easier to design cores with high burnup and reduced region size.

Finally, because the top plenum region is now a gap 56 less than two inches long in the fuel rods 44, 46, no spring, clip nor other structure is necessary to constrain the motion of the fuel pellet stack. This is because the length of the plenum or gap 56 is now short enough that the stack does not have sufficient length to accelerate to damage itself. Elimination of the spring or clip results in an important simplification of the manufacturing process and also produces another small increase in the plenum size.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A fuel rod for use in a nuclear reactor fuel assembly, said fuel rod comprising:
   (a) an elongated hollow cladding tube;
   (b) a pair of end plugs connected to and sealing said cladding tube at opposite ends of thereof; and
   (c) an axial stack of fuel pellets contained in and extending between said end plugs at said opposite ends of said tube, all of said fuel pellets contained in said tube being composed of fissile material being enriched above the level of natural enrichment;
   (e) said fuel pellets in said stack thereof being provided in an arrangement of axial regions, said arrangement of axial regions including a pair of first axial regions defined respectively at said opposite ends of said pellet stack adjacent to said respective end plugs, said pellets in said first axial regions being identical in number and having annular configurations with an annulus of a first void size, said arrangement of axial regions also including another axial region defined between said first axial regions, some of said pellets in said another axial region having solid configurations.

2. The fuel rod as recited in claim 1, wherein said first void size of each pellet in said first axial regions is about forty percent of the volume of said pellets.

3. The fuel rod as recited in claim 1, wherein said fissile material is uranium dioxide having a single U-235 enrichment.

4. The fuel rod as recited in claim 1, wherein said another axial region includes second and third axial regions defined in tandem relation to one another between said first axial regions, said pellets in said second axial region having annular configurations with an annulus of a second void size smaller than said first void size of said annulus of each said pellets in said first axial regions, said pellets in said third axial region having said solid configurations.

5. The fuel rod as recited in claim 4, wherein said first void size of each pellet in said first axial regions is about forty percent of the volume of said pellet.

6. The fuel rod as recited in claim 4, wherein said second void size of each pellet in said second axial region is about ten percent of the volume of said pellet.

7. A fuel rod for use in a nuclear reactor fuel assembly, said fuel rod comprising:
   (a) an elongated hollow cladding tube;
   (b) a pair of end plugs connected to and sealing said cladding tube at opposite ends thereof; and
   (c) a plurality of fuel pellets contained in and extending between said end plugs at said opposite ends of said tube, all of said fuel pellets contained in said tube being composed of fissile material being enriched above the level of natural enrichment;
   (d) said fuel pellets being provided in an axial stack having a length slightly less than the distance between said end plugs at said opposite ends of said tube such that, when said tube is disposed in a vertical orientation, said stack of pellets at a lower end rests on a lower one of said end plugs and at an upper end is spaced from said upper one of said end plugs by a gap being devoid of any structure for restraining the upper end of said stack of pellets from movement toward said upper one of said end plugs;

(e) said fuel pellets in said stack thereof being provided in an arrangement of axial regions which includes a pair of first axial regions defined respectively at said opposite ends of said pellet stack adjacent to said respective end plugs, said pellets in said first axial regions being identical in number and having annular configurations with an annulus of a first void size, said arrangement of axial regions also including another axial region defined between said first axial regions, some of said pellets in said another axial region having solid configurations.

8. The fuel rod as recited in claim 7, wherein said first void size of each pellet in said first axial regions is about forty percent of the volume of the said pellet.

9. The fuel rod as recited in claim 7, wherein said fissile material is uranium dioxide having a single U-235 enrichment.

10. The fuel rod as recited in claim 7, wherein said another axial region includes second and third axial regions defined in tandem relation to one another between said first axial regions, said pellets in said second axial region having annular configurations with an annulus of a second void size smaller than said first void size of said annulus of each said pellets in said first axial regions, said pellets in said third axial region having said solid configurations.

11. The fuel rod as recited in claim 10, wherein said first void size of each pellet in said first axial regions is about forty percent of the volume of said pellet.

12. The fuel rod as recited in claim 10, wherein said second void size of each pellet in said second axial region is about ten percent of the volume of said pellet.

* * * * *